Feb. 7, 1967 | J. L. SCHOEMANN | 3,303,291

MINIATURE TELEPHONE SUBSET

Filed March 4, 1964

INVENTOR.
JERRY L. SCHOEMANN
BY
C. A. Gulbrandsen
ATTY.

3,303,291

MINIATURE TELEPHONE SUBSET

Jerry L. Schoemann, Glen Ellyn, Ill., assignor to Automatic Electric Laboratories, Inc., Northlake, Ill., a corporation of Delaware Filed Mar. 4, 1964, Ser. No. 349,412
9 Claims. (Cl. 179—100)

This invention relates to telephone sets and more particularly to improvements in telephone apparatus used in the more recently developed smaller size telephone sets.

A telephone set of this general type is disclosed for example in U.S. Patent 2,990,456, issued December 27, 1960, to W. C. Nise, and assigned to the present assignee.

While such sets have in general proved satisfactory, one problem that has been encountered with the development of smaller size telephones is insufficient space for all the apparatus, or the basic subassemblies, which normally go into it; namely, a hookswitch assembly, a transmission network and a ringer assembly, the above-cited patent is a good example of this in that its space limitations do not permit the inclusion of the ringer assembly inside the housing. In some instances the space problem has been resolved by removing the ringer assembly from the telephone set and placing it in a self-contained unit. This of course added both to the installation cost and manufacturing cost of the telephone set.

Another limitation in the apparatus used heretofore in connection with smaller size telephones is that a key type (push button) signaling device could not be easily substituted for a conventional dial type signaling device due to the former's slightly larger size.

An object of the invention is to provide improvements in telephone apparatus used in the smaller size telephone sets, and to alleviate problems which were incurred heretofore in connection with them.

A more specific object of the invention is to provide an improved hookswitch assembly which through better utilization of available space within the housing makes it possible to include the ringer assembly in the telephone set.

Another object of the invention is to provide a base plate assembly of a smaller size telephone which can be used both when the telephone is used as a wall type phone and a desk type phone, thereby greatly facilitating standardization of parts.

Still another object of the invention is to provide improved apparatus for the telephone set whereby the cost of manufacture thereof can be reduced materially.

The invention is embodied in a telephone set having a base plate assembly, a housing and a handset. The base plate assembly more specifically features a hookswitch assembly of novel design and construction. The hookswitch is supported at two ends and has two arms or arm portions. One arm carries a cam which actuates a split contact spring pileup positioned below the arm. With the pileup located in this position there is sufficient space for the ringer assembly in the telephone and less force is required for the actuation of the contact springs. Fixed shafts extend through the arm portions and thereby provide a bearing surface for the hookswitch frame.

Standardization of parts for the wall mounted phone and the desk mounted phone is realized through the employment of a unique plunger assembly which is mounted to the inside of the wall phone housing and made compatible with the base plate assembly used in the desk mounted phone. Thus the two phones have the same base plate assembly.

These and additional objects and features of the invention will become obvious by making a perusal of the following detailed description taken in conjunction with the drawings of which:

Figure 1:
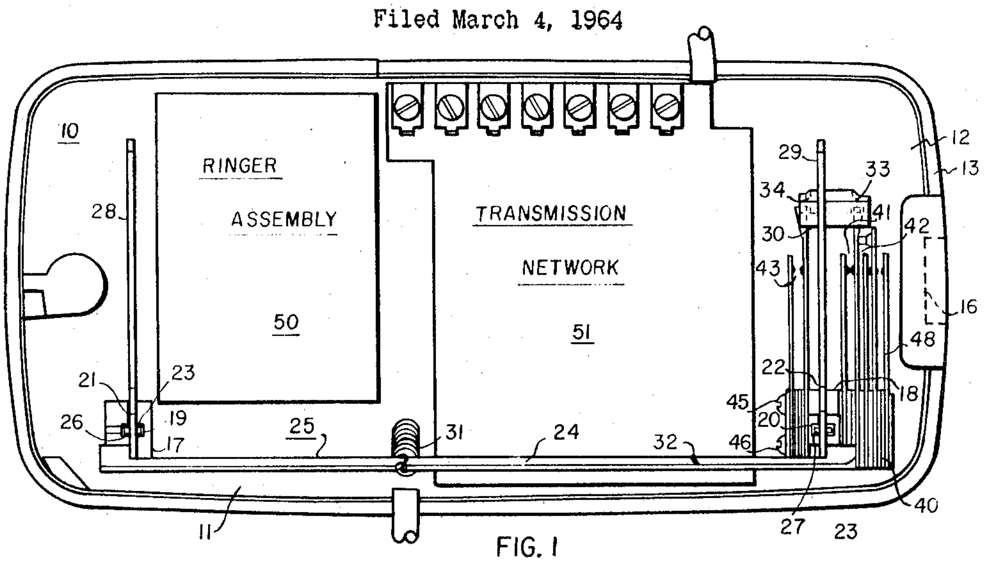
FIG. 1 is a top view of a base plate assembly for a small size telephone set.

Referring now to the drawings, FIG. 1 shows a top view of a base plate assembly 10 according to a preferred embodiment. The assembly includes as subassemblies a base plate 11, a novel hookswitch assembly 25, a contact spring pileup 40, a ringer assembly 50, and a transmission network 51. Since the ringer assembly and the transmission network are incidental to the invention they are shown in block form.

The base plate 11 serves as the support for the other components of the assembly. It is preferably molded from a durable plastic material, as for instance ABS (acrylonitrile-butadiene-styrene) material, to simplify its manufacture and reduce its cost. The base plate includes a bottom 12 with a peripheral flange like side 13. Feet 14 and 15 are integrally connected to bottom 12 and stabilize the telephone set when the latter is mounted to either a wall or desk. Formed in side 13, along one end of the base plate, is a depression 16 which receives a corresponding latch or projection 31 located on the housing. The latch and depression feature facilitates installation of the telephone set by eliminating one securement screw formerly needed to fasten the housing to the base plate. Resulting from this is a reduction in assembly operations and cost.

In addoition to the above, base plate 11 includes two other embossed sections 17 and 18 which are molded integrally to bottom 12. These serve as the bearing supports for the hookswitch assembly discussed in detail later in the specification. They are preferably square in cross-section and include slots 19–22. Slots 19 and 20 receive shafts 26 and 27 respectively and slots 21 and 22 receive the corresponding arm portions 28 and 29 of hookswitch frame 24 discussed subsequently.

Figure 3:
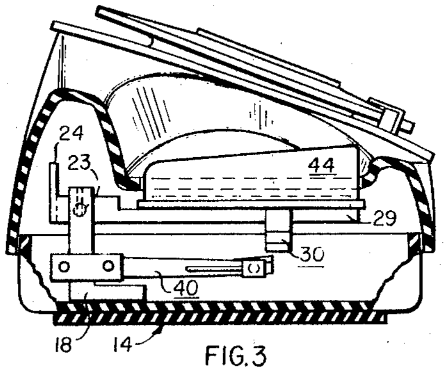
FIG. 3 is a cross-sectional view of a desk type phone using a base plate assembly as shown in FIG. 1.

The shafts are round in cross-section where they extend through apertures 23, see FIG. 3, of the arm portion and rectangular at the ends. The slots are made compatible with the configuration of the shafts and as a result the shafts cannot rotate. This feature is advantageous because it avoids wear on the embossed sections which could ultimately effect the stability of the hookswitch. The shafts serve as the bearing surfaces for the hookswitch frame and since they are preferably made of a good bearing material such as brass virtually all wear is eliminated.

The hookswitch assembly shown in both FIGS. 1 and 3 includes a frame 24, cam 30, and the above mentioned shafts 26 and 27. The frame consists of a main portion 32 and the two aforementioned arm portions 28 and 29. The main portion is made of flat cold rolled steel which is preferably U-shaped and which has an inside and outside edge. The main portion extends over at least portions of the ringer assembly and transmission network. This allows for better spacing of components in the base plate and for inclusion of the ringer assembly.

The two arms 28 and 29 are connected to the inside edge of the legs of the main portion and extend perpendicular to it. Shafts 26 and 27 are placed in the aforementioned apertures 23, see FIG. 3, located near the point where the arm portions join the main portion. The shafts provide a bearing surface for the hookswitch frame and float within the arm portions thereof to provide for any minor variation in spacing between the embossed sections 17 and 18 or in the spacing between the arms.

Spring 31 is the means used to hold the hookswitch assembly in position relative to the base plate and more specifically to hold the shafts 26 and 27 within the slots. One end of the spring is fastened to main portion 32 and the other is fastened to an appropriate hook clip, for example, which is connected to bottom 12.

FIG. 3 shows one of two buffers 44 that are connected to the arms of the hookswitch when the base plate assembly is used with a desk type housing. The buffers serve as the means of linking the handset with the hookswitch assembly and are press fitted on the arm portions. This figure also illustrates the operative relationship of cam 30 and the spring pileup 40. Furthermore here it shows how the hookswitch pivots on shafts 26 and 27; how the shafts are located within the embossed sections; and how the transmission network and ringer assembly conveniently extend under the U-shaped main portion of the hookswitch.

Cam 30 is made of an insulating material such as plastic and carried by the arm portion 29. Securement is made by press fitting the cam onto the lower edge of arm 29 at a slot (not shown) purposely provided. The cam includes a pair of cam surfaces 33 and 34 which are clearly shown in FIG. 2, and which actuate the contact springs of spring pileup 40 in response to the movement of the frame. More particularly cam surface 33 serves to actuate a set of contact springs consisting of "make" contacts 48, and "break" contacts 41 and 42, and cam surface 34 serves to actuate a set consisting of "make" contact 43. It is important to realize that the force required to actuate the contact springs is reduced by virtue of a split pileup. Furthermore, more controlled contact operation is made possible by the split pileup. Although a specific contact arrangement is shown there are other arrangements also that would be satisfactory.

Spring pileup 40 is mounted on embossed section 18 by use of self tapping screws 45 and 46, for example, which are inserted into apertures that are formed in the base plate at the time of molding.

The location of the spring pileup and its manner of actuation is unique and provides a substantial amount of room for the other necessary apparatus of the telephone set. Also, the cost of the telephone set can be reduced by virtue of the arrangement being simplified and requiring far less assembly operations.

Figure 2:
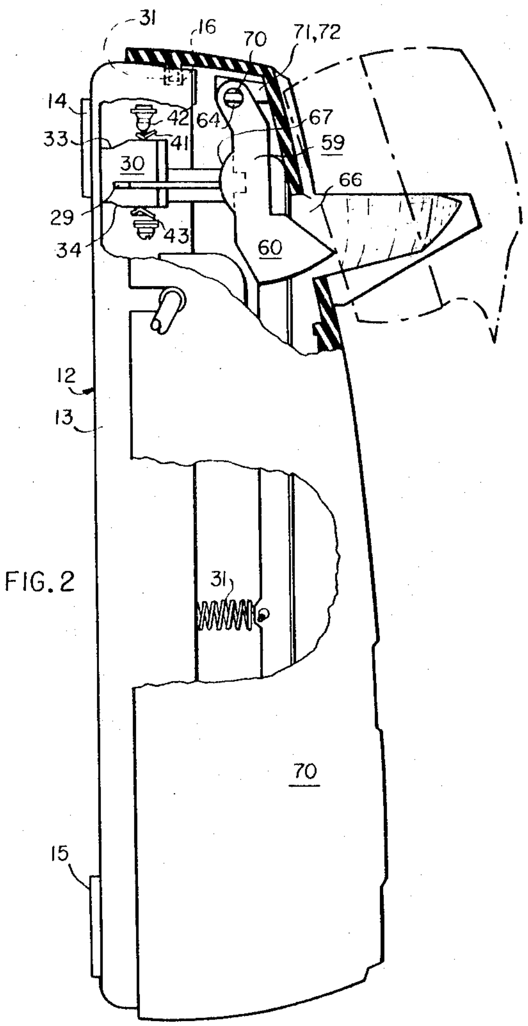
FIG. 2 is a side view of a telephone set which includes the base plate assembly shown in FIG. 1, the plunger assembly, and a wall type telephone housing.
Figure 4:
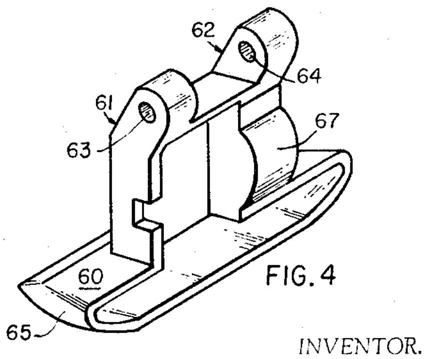
FIG. 4 shows a perspective view of the plunger which is used in conjunction with the wall type telephone housing disclosed in FIG. 2.

Referring now to FIGS. 2 and 4, plunger assembly 59 is the means employed whereby the base plate assembly can be used in connection with a wall mounted phone in addition to being used in connection with a desk mounted phone. This feature of being able to use a single base plate assembly for the two types of phone makes it possible for telephone operating companies to reduce their inventory.

The plunger assembly includes a plunger element 60, a shaft 70 and two bearing supports 71 and 72. The plunger element 60 is preferably molded of plastic material and serves as the connecting link between the handset and the hookswitch assembly, similar to how the buffers serve this end in connection with a desk mounted housing. The plunger features two ears that are spaced from each other and include apertures 63 and 64. At an opposite end of the plunger is located an anvil-shaped member 65; the latter projects through housing opening 66 and engages the handset when it is in a mounted position. Still another feature of the plunger is cam surface 67 which rides against arm portion 29 and which is located at a point farthest away from the pivot point. This provides the arrangement with a mechanical advantage and reduces the force required to move the hookswitch.

Bearing supports 71 and 72 are molded integrally to the housing and have an open end slot for receiving shaft

70. Mounting takes place when shaft 70 is inserted into apertures 63 and 64 and positioned in the slots. Because of the engagement of the plunger with the arm portion at an intermediate point between where the handset exerts a force upon the plunger and the shaft exerts a force, the shaft does not have to be locked in position as the force acting on the shaft is always directed toward the base preventing the plunger from dropping out.

The preferred embodiment of the invention has been described in detail, however, it should be understood that this was done by way of example and was not intended to limit the spirit and scope of the invention as defined only by the appended claims.

What is claimed is:

1. A telephone subset having a base plate, a housing, a handset mountable on said housing, hookswitch contact means, a hookswitch assembly controlling said contact means and comprising a frame having a main portion and at least one arm extending substantially perpendicular to said main portion, hookswitch contact actuating means attached to said arm, means pivotally supporting said frame on said base plate, said contact means being supported on said base plate at a point adjacent the pivotal aixs of said frame and extending substantially parallel to said arm, arm actuating means engageable by said handset, and biasing means connected to said frame for urging said arm actuating means into engagement with said handset when said handset is replaced on said housing.

2. A telephone subset as claimed in claim 1, wherein said pivotal supporting means comprises two spaced embossed sections formed integrally with said base plate, at least one of said sections also serving as the support for said contact means.

3. A telephone subset as claimed in claim 1, wherein said hookswitch contact means comprises a plurality of contact springs, each mounted in a plane parallel to said arm and wherein said contact actuating means comprises a substantially wedge-shaped cam which upon pivotal movement of said frame acts on said contact spring sets in a direction substantially perpendicular to the direction of movement of said arm and cam.

4. A telephone subset as claimed in claim 3 wherein said contact means comprises two sets of contact springs respectively extending along opposite sides of said arm.

5. A telephone subset having a base plate, a desk-type housing, a handset mountable on said housing, hookswitch contact means, a hookswitch assembly controlling said contact means and comprising a U-shaped frame having an elongated main portion and two arms, hookswitch contact actuating means attached to at least one of said arms, means pivotally supporting said frame on said base plate, said contact means being supported on said base plate at a point adjacent the pivotal axis of said frame and extending substantially parallel to said arm, a pair of buffer elements mounted on said arm and engageable by said handset, so that replacement of said handset on said buffer elements causes the depression of said arm and the consequent activation of said contact means, and biasing means connected to said frame for urging said buffer elements into engagement with said handset when said handset is replaced on said housing.

6. A telephone subset having a base plate, a handset, a wall type housing including a support for said handset, hookswitch contact means, a hookswitch assembly controlling said contact means and comprising a U-shaped frame having an elongated main portion and two arms, hookswitch contact actuating means attached to at least one of said arms, means pivotally supporting said frame on said base plate, a plunger assembly comprising a plunger element and means for pivotally mounting said element in said housing, said plunger element engageable by said handset, and operatively engaging said arm at a point between said mounting means and the point of engagement of said element by said handset so that replacement of said handset on said support causes said element to pivot said arm, thereby activating said contact means, and biasing means for said U-shaped frame, said frame urging said plunger element through the medium of said arm into engagement with said handset when said handset is replaced on said support.

7. A telephone subset as claimed in claim 6, wherein said contact means comprises two sets of contact springs respectively extending along opposite sides of said arm, said contact actuating means comprises a substantially wedge-shaped cam which upon pivotal movement of said frame acts on said contact springs in a direction substantially perpendicular to the direction of movement of said arm and cam, and said pivotal supporting means comprises two spaced embossed sections formed integrally with said base plate, at least one of said sections also serving as the support for said contact means.

8. A telephone subset having a base plate, a housing, a handset mountable on said housing, a ringer assembly, a transmission network, two sets of contact springs, and a hookswitch assembly controlling said contact springs and comprising a U-shaped frame having an elongated main portion and two arms and embracing said ringer assembly and transmission network, means pivotally supporting said frame on said base, said two sets of contact springs both being supported on said base plate adjacent the pivotal axis of said frame and respectively extending along opposite sides of, and parallel to, at least one of said arms, arm actuating means engageable by said handset, biasing means connected to said frame for urging said arm actuating means into engagement with said handset when said handset is replaced on said housing, and a substantially wedge-shaped cam attached to said arm which upon pivotal movement of said frame acts between said two sets of contact springs in directions perpendicular to the direction of movement of said arm and cam, thereby activating said contact springs.

9. A telephone subset as claimed in claim 8, wherein said pivotal supporting means comprises two spaced embossed sections formed integrally with said base plate, at least one of said sections also serving as the support for said contact means.

References Cited by the Examiner

UNITED STATES PATENTS

| | | | |
|---|---|---|---|
| 2,946,857 | 7/1960 | Benjamin | 179—100 |
| 2,972,021 | 2/1961 | Bryant et al. | 179—100 |

KATHLEEN H. CLAFFY, *Primary Examiner.*

J. W. JOHNSON, *Examiner.*